United States Patent
Cote

[19]

[11] Patent Number: 5,785,504
[45] Date of Patent: Jul. 28, 1998

[54] PUMP WITH SEPARATE PUMPING STAGES FOR PUMPING A PLURALITY OF LIQUIDS

[75] Inventor: Denis Cote, Ham-Nord, Canada

[73] Assignee: Les Entreprises Denis Darveau Inc., Canada

[21] Appl. No.: 624,436

[22] PCT Filed: Oct. 6, 1994

[86] PCT No.: PCT/CA94/00547

§ 371 Date: Jun. 27, 1996

§ 102(e) Date: Jun. 27, 1996

[87] PCT Pub. No.: WO95/09983

PCT Pub. Date: Apr. 13, 1995

[30] Foreign Application Priority Data

Oct. 7, 1993 [CA] Canada ................... 2107933

[51] Int. Cl.$^6$ .................. F04B 21/00; F04B 23/04
[52] U.S. Cl. .................. 417/313; 417/244; 417/423.5; 417/533; 210/195.2
[58] Field of Search .................. 417/250, 251, 417/244, 313, 423.5, 410.3, 521, 533; 210/652, 195.2, 416.1

[56] References Cited

FOREIGN PATENT DOCUMENTS

| | | |
|---|---|---|
| 33 04 012 | 11/1983 | Germany. |
| 88 10 330 | 11/1988 | Germany. |
| 38 38 946 | 6/1989 | Germany. |
| WO 93/14319 | 7/1993 | WIPO. |

*Primary Examiner*—Charles G. Freay
*Attorney, Agent, or Firm*—Klauber & Jackson

[57] ABSTRACT

The pump comprises three distinct series of pumping stages driven on a single shaft by the same motor. Between the first and second series of pumping stages, the liquid is diverted from the pump through a by-pass towards, for example, a filtering device for removing the liquid as many impurities as possible. Then, the filtered liquid is conveyed back to the second series of pumping stages of the pump where the liquid is pumped at high pressure before being conveyed through a by-pass outside of the pump and towards a treatment chamber, such as a chamber for reverse osmosis, nanofiltration, or the like. The permeate (filtered solution) is removed from the installation whereas the solute (concentrated solution) is, in large part, reconveyed towards a third series of pumping stages, at the discharge of which the liquid is mixed with the filtered liquid from the second series of stages and the mixture is then conveyed again towards the treatment chamber. This high yield system eliminates a second and third pump. The pump can also be used for pumping independently, that is without mixing, more than one liquid. In this case, the pumping stages are once again separated from one another, with each stage pumping its respective liquid. The stages are capable of pumping liquids with different rates and at different discharge pressures.

4 Claims, 3 Drawing Sheets

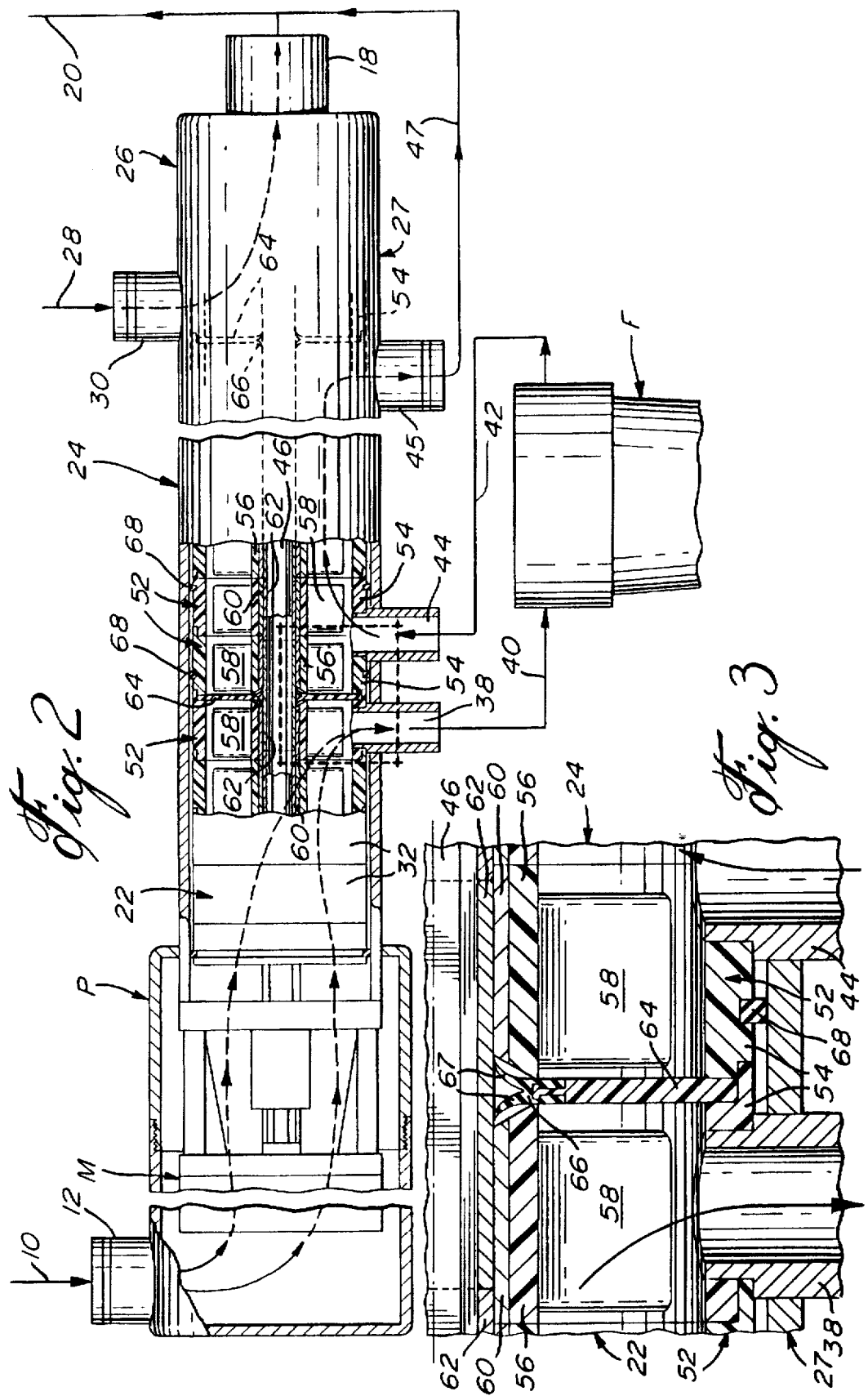

PUMP WITH SEPARATE PUMPING STAGES FOR PUMPING A PLURALITY OF LIQUIDS

FIELD OF THE INVENTION

The present invention relates to a pressure and liquid recirculation pump which includes mainly an intermediary inlet and an intermediary outlet for the liquid being pumped. More particularly, the present invention relates to an installation used for the concentration of a solution, such as maple water, impure water, and others, by way of a process using a semi-permeable membrane.

According to the present invention, the pressure pump is used both for feeding the liquid, such as maple water, from a stocking tank towards a filter, and then for the introduction under pressure of the filtered liquid in a housing which encloses the membrane, and finally for recirculating the liquid so as to remedy to the filling in or plugging of the membrane and to reduce the concentration at the membrane surface, thereby resulting in a lowering of the osmotic pressure and producing an increase in the permeation flow.

DESCRIPTION OF THE PRIOR ART

It is well known in reverse osmosis processes that the solutions of salt or other solutes, notably those having low molecular weights, for example sea water, maple water and others, are introduced to a selective membrane and submitted to a pressure. Contrary to what happens in the case of a normal osmosis where there is an equilibrium of the solution on both sides of the membrane, the reverse osmosis results in that a solution having a low, and even extremely low, concentration appears on the side of the membrane opposite that of the original solution. In summary, in order to reverse the normal osmotic flow from the side of the membrane where the solution is less concentrated towards the side where the solution is more concentrated, there is exerted on the solution to be treated a pressure differential higher than the osmotic pressure differential of the solutions in contact with the surfaces of the membrane.

It has now been noticed that, during a reverse osmosis process, the concentration at the interface membrane-solution to be treated is higher than the average concentration on the high pressure side of the membrane. This abnormally high concentration at the interface penalizes the quality of the product obtained by the reverse osmosis process because, on the one hand, a considerable amount of salt or other matters in solution, in contact with the membrane is rejected, and on the other hand, by recirculation, there is a reduction of the concentration at the surface of the membrane of the not-very-soluble components which can be tolerated without precipitating on the membrane.

Commonly, the expression filling-in or plugging refers to all phenomena, other than temperature and compaction variations, which reduce a membrane's permeability to pure water. The phenomena are linked to the presence of solutes or of matters in suspension, notably colloids, bacteria, etc., which can deposit at the surface or in the pores of the membrane. The plugging can be more or less rapid depending on the nature of the particles which are present and on their concentration at the surface of the membrane. To obviate to the problems resulting from the plugging of the membrane, which is more or less reversible, rinsing of the membrane using hot or cold water or the cleaning thereof are carried out.

In the production or maple syrup, the maple water has always been evaporated until the syrup was obtained. Now, with the high increase in the price of energy, it is useful to proceed with the evaporation from the solution which is more concentrated than the water directly obtained from the maple tree. In order to do so, reverse osmosis processes have been used, wherein the substantially pure water is discharged and the concentrated water retained. As in the other reverse osmosis cases, there is a serious problem of plugging at the level of the membrane. Indeed, the solutes contained in the maple water are essentially sugars and minerals. The maple water also contains some bacteria, the number of which varying from a few dozens to many millions per ml. The solutes are almost all retained by the membranes of the reverse osmosis or nanofiltration types, notably almost 100% for the sugars and more than 95% for the minerals. A fortiori, the particles in suspension, including the bacteria, are also retained. The sugar molecules, which, being larger, circulate less rapidly than the ions, represent most of the minerals in the solution. All of this favors, relatively, a larger accumulation of sucrose than of minerals at the surface of the membrane, which results in a considerable plugging of the latter.

Nowadays, it has been observed that the best way of overcoming, at least partly, the problem of the plugging of the membrane resides in the recirculation of the liquid being treated, by reverse osmosis. To do so, the liquid can be recirculated in the same pump, or the recirculation can be achieved by way of an additional pump. In a system without recirculation, there has been obtained a recovery of 19% (permeate flow:feed flow), and consequently, there is a large waste of water. If, on the other hand, recirculation takes place in the same pump, an average recovery of approximately 24% is obtained; but there is also a large waste of water and energy. To obtain a satisfactory yield, there must be used three similar systems, one after the other, which is very expensive. To obtain a adequate output of approximately 75%, in a sole operation, two pumps can be used wherein one of the pumps is used only for recirculation. This alternative is, however, very expensive because of the presence of two pumps.

Moreover, a further pump is required to supply the untreated maple water stocked in a tank (or in any reservoir) from this tank towards a filter which will eliminate some of the impurities found in the untreated maple water. Therefore, a first pump is normally used for supplying the untreated maple water from the stocking tank towards the filter, with a second pump being used for supplying the filtered maple water from the filter to the reverse osmosis device, and finally with a third pump being used for recirculating the concentrated solution removed from the reverse osmosis device towards the inlet of this same device.

It would thus be useful to use a system having a single pump and having a recovery substantially improved with respect to what is presently known and which would be comparable to the use of three pumps.

Regarding the prior art, the following documents must be noted, although irrelevant with regard to the present invention:

U.S. Pat. No. 3,472,765
U.S. Pat. No. 3,505,215
U.S. Pat. No. 4,705,625
U.S. Pat. No. 4,773,991.

SUMMARY OF THE INVENTION

It is therefore an object of the present invention to provide a novel pump adapted for certain uses that normally require at least two conventional pumps and characterized in that the pump comprises at least two distinct pumping means adapted to pump at least two liquids and especially comprises a liquid intermediary outlet and a liquid intermediary inlet.

Another object of the present invention resides in a pump comprising at least two distinct series of pumping stages and separation means disposed between the liquid derivation intermediary outlet and intermediary inlet.

Another object of the present invention resides in that, at the end of the first series of pumping stages, the liquid is completely removed from the pump by way of the intermediary outlet and in that a liquid, sometimes the same, but further treated in one form or another, reaches the second series of pumping stage by the intermediary inlet.

Therefore, in accordance with the present invention, there is provided a pump comprising a housing and at least first and second pumping means in the housing which are adapted to be driven by a single motor, the first and second pumping means including respectively a liquid inlet and a liquid outlet and being separated in the housing by separation means; the first and second pumping means include also, respectively, a liquid intermediary by-pass outlet and a liquid intermediary by-pass inlet disposed on one side and the other of the separation means such that a liquid reaching the housing by the inlet is pumped by the first pumping means and leaves the housing through the intermediary by-pass exit, a liquid thus being capable of also reaching the housing by the intermediary by-pass inlet and being pumped by the second pumping means up to the outlet.

Also, in accordance with the present invention, there is provided a pump comprising a housing and at least a first and second pumping means inside the housing which are adapted to be driven by a single motor, the first and second pumping means each comprising a liquid inlet and a liquid outlet and being separated in the housing by separation means, the first and second pumping means being thus adapted for pumping different liquids without any mixture thereof in the pump, the liquids reaching the pumping means by respective inlets and leaving the same by respective outlets.

Further in accordance with the present invention, there is provided an installation for the concentration of a solution by reverse osmosis or other process using a semi-permeable membrane, this installation comprising a housing enclosing a semi-permeable membrane responsible for the concentration of the solution; a pump allowing for the introduction of the solution under pressure in the housing, as well as means for ensuring the recirculation of part of the solution. The pump comprises first and second pumping means, such as two series of pumping stages, adapted to be driven by a single motor, the first and second pumping means being hydraulically separated in the pump by separation means, the first pumping means including an inlet and an outlet for the untreated liquid, the second pumping means including an inlet and an outlet for the recirculated liquid such that a liquid reaching the pump through the inlet for untreated liquid is pumped by the first pumping means and is removed from the pump through the outlet for the untreated liquid, whereas a concentrated liquid from the housing reaches the second pumping means through the inlet for the recirculated liquid and is removed from the pump through the outlet for the recirculated liquid, the liquid and the recirculated liquid being mixed together downstream of the first and second pumping means and upstream of an inlet of the housing.

BRIEF DESCRIPTION OF THE DRAWINGS

Having thus generally described the nature of the invention, reference will now be made to the accompanying drawings, showing by way of illustration preferred embodiments thereof, and in which:

FIG. 2 is a fragmented elevational view, partly in longitudinal cross-section, of the pump of FIG. 1;

FIG. 3 is a developed and enlarged view of the section of the pump which is framed by the dotted lines on FIG. 2.

DESCRIPTION OF THE PREFERRED EMBODIMENTS

Figure 1:
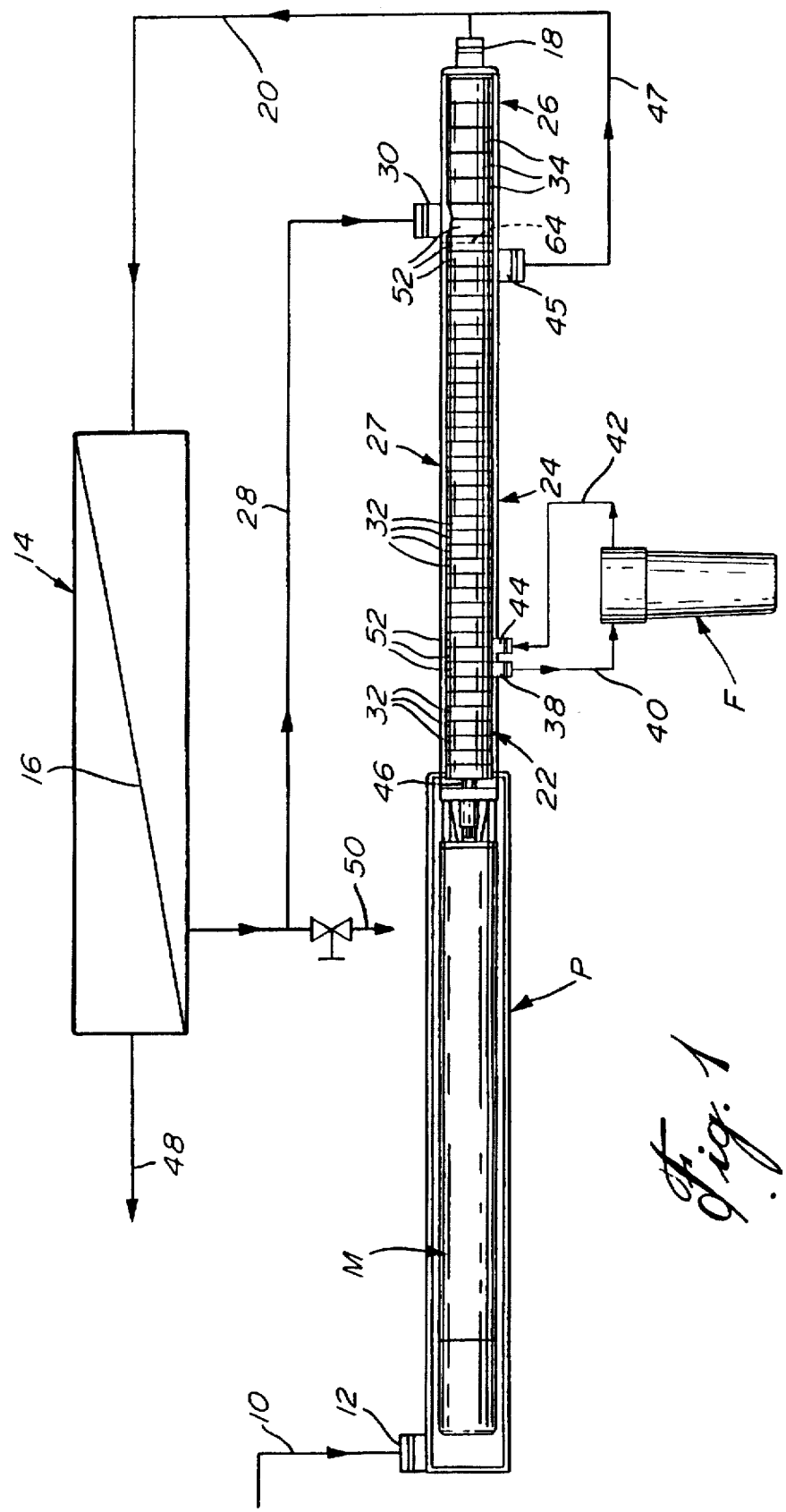
FIG. 1 is a schematic representation of a pump in accordance with the present invention having derivation intermediary inlets and outlets and installed on a liquid filtration and filtered liquid concentration reverse osmosis system.

With reference to the drawings, and more particularly to FIG. 1, it is seen that the illustrated installation comprises a pump P in accordance with the present invention connected to a source of liquid (not illustrated), such as a stocking tank, by a conduit 10 connected to a primary inlet 12 of the pump P and to a housing 14 comprising a semi-permeable membrane 16 by a main outlet 18 and a conduit 10. A submersible or exterior motor M (or M' see FIG. 4) is evidently foreseen in the body of the pump P or at the exterior of the pump which is essentially constituted by a first series of pumping stages 22, of a second series of pumping stages 24 and a third series of pumping stages 26 successively disposed in an aligned manner in the housing 14 of the pump P so as to be driven by a single shaft connected to motor M, M' inside a cylindrical housing 27.

On the other hand, the housing 14, including membrane 16, is connected once again to the pump P by a conduit 28 which is connected at the beginning of the third series of pumping stages 26 by means of a secondary inlet 20.

It is to be noted that the components constituting the first and second series of pumping stages 22 and 24 are so selected as to ensure the conveying under pressure of a volume of a solution to be concentrated which corresponds generally to the permeation capacity of the membrane 16 in the installation and to an equivalent evacuation of approximately 10% to 25% of the permeation rate. The permeate (i.e. water practically pure) is directed outside the housing 14 (and withdrawn from the installation) by a conduit 48 whereas a concentrated solution (i.e. maple water concentrated in sugar) is rejected from the recirculation by an evacuation conduit 50. These constitutive elements have been illustrated by reference numeral 32.

Concerning the constitutive elements of the third series of pumping stages 26, they should deliver an important volume of recirculation liquid. The constitutive elements of the third series of stages 26 are represented by reference numeral 34. Finally, at the level of the secondary inlet 30 in the pump P between the second and third series of pumping stages 24 and 26, elements 52 have been foreseen and constitute a guide enabling the simultaneous conveying towards the third series of stages 26 of the liquid to be concentrated coming from the first and second series of pumping stages 22 and 24 as well as of the recirculated liquid in the third series of pumping stages 26 of the pump P, via conduit 28 and secondary inlet 30, from the housing 14 where membrane 16 is located.

The present invention is characterized by the structure which is inserted between the first and second series of pumping stages 22 and 24 and between the second and third series of pumping stages 24 and 26. Indeed, as described in detail hereinafter, the liquid from the stocking tank by means of the conduit 10 and the primary inlet 12 cannot access directly, from the first series of stages 22, the second series of pumping stages 24 through the housing 27 of the pump P since there exists, in the latter, between the first and second series of pumping stages 22 and 24 and between the second and third series of pumping stages 24 and 26, devices for the total interruption of the flow of liquid in the pump P. Therefore, with reference to FIG. 1, the end of the first series of pumping stages 22 is equipped with a first intermediary outlet 38 which opens onto the first derivation conduit 40. The liquid deviated outside the pump P is conveyed by this first derivation conduit 40 towards, for example, a filter F (for example, 5 microns) conceived to withdraw some of the impurities in the liquid, such as maple water. The filtrated liquid is then conveyed by means of a second derivation conduit 42 towards an intermediate inlet 44 which communicates with the beginning of the second series of stages 24.

Similarly, the liquid thus filtrated is conveyed at high pressure by the second series of pumping stages 24 and the liquid at high pressure is forced to exit the pump P by a second intermediate outlet 45 and connects, through a conduit 47, with conduit 20 where the filtrated liquid at high pressure is mixed to the recirculated liquid which is delivered by the third series of stages 26 through the main outlet 18.

For more detailed descriptions of elements 32 and 34, one can refer to a co-pending Canadian application No. 2,059,392 filed Jan. 15, 1992 wherein the elements 32 and 34 are impellers, those situated at the level of the first and second series 22 and 24 of the pumping stages being adapted to ensure the conveying of a given volume of liquid to be concentrated towards the housing 14, which volume is dictated by the capacity of the membrane 16. Concerning the third series of pumping stages 26, they consist of impellers having a greater volume than those foreseen for stages 22 and 24 since they must carry out the conveying of the recirculated liquid towards the membrane 16. It is to be noted that the three series of stages 22, 24 and 26 are all driven by a common shaft 46 (which is itself driven by a single motor, i.e. motor M) having a hexagonal section. Generally shaft 46 drives in rotation the impellers of elements 32 and 34 whereas the diffusers and the housings, or peripheral rings of the latter, remain fixed with respect to the shaft 46.

Between the first and second series of pumping stages 22 and 24 and between the second and third series of pumping stages 24 and 26 are located derivation elements 52. These derivation elements 52 situated between the first and second series of stages 22 and 24 are illustrated in detail in FIGS. 2 and 3. The derivation elements 52 situated between the second and third series of pumping stages 24 and 26 being similar are therefore not illustrated in detail. Each derivation element 52 includes a peripheral rim 54 which can be hermetically fitted with an adjacent rim 54 or with elements 32 of the first and second series of pumping stages 22 and 24. The rim 54 is connected at a central hub 56 having a drilled hole by means of grooves 58 having a radial orientation and in the form of blades. The rim 54, the central hub 56 and the grooves 58 are integrally made of a plastics construction. A bronze bearing 60 fixed in the hole of the central hub 56 receives internally a sleeve 62 which displays an inner opening having a shape corresponding to that of shaft 46 such that the sleeves 62 are rotably displaced with the shaft 46 inside the fixed bearing 60.

The intermediate outlet and inlet 38 and 44 communicate with hollow parts of the derivations elements 52 (i.e., those parts provided between the grooves 58 in a longitudinal fashion and between the central hub 56 and the rim 54 in a radial fashion) by means of openings conventionally provided (for example, as in the patent application mentioned above) in the rims 54. A separation disc 64 located in a fixed manner between two of the elements 52 and also located between the intermediate outlet and inlet 38 and 40 is provided to by-pass all the liquid outside the pump P by the intermediate outlet 38, towards the filter F by the derivation conduit 40, the filtrated liquid arriving once again at the pump P at the level of the second series of stages 24, by the intermediary inlet 44. The separation disc 64 is full, except for an inner opening intended to encircle the sleeves 62. To this opening, the disc comprises a flexible annular section 66, preferably covered with Teflon™, which bears against the sleeve 62 in order to ensure a sealing engagement inside the pump P longitudinally on either side of the separation disc 64 at the level of the interfaces between the fixed pieces and rotating pieces. The flexible annular section 66 comprises two legs 67 so as to provide a bidirectional seal joint. The tightness between the periphery of the rims 54 and the interior of the housing 27 of the pump P is ensured by toroidal joints 68.

The derivation elements 52 of the second and third series of pumping stages 24 and 26 and, more particularly the separation disc 64, cause the by-passing of the filtered liquid outside the pump P by a second intermediary outlet 45 and towards the housing 14 by means of conduits 47 and 20.

Also, as an example, the liquid conveyed to the primary inlet 12 may flow under a 10 gallons per minute (GPM) and at a pressure of 30 psi. The liquid under a flow rate of 10 gallons per minute flows in the derivation conduits 40 and 42, respectively, under pressures, for example, of 70 psi and 55 psi, the difference being due to the pressure loss in the filter F. The liquid coming out of the first and second series of pumping stages 22 and 24 has a pressure of 485 psi and a volume of 10 gallons per minute. The recirculated liquid arriving by conduit 28 and the secondary inlet 30 to a third series of stages 26 has a pressure of 485 psi and a discharge rate of 60 gallons per minute. The liquid coming out of the third series of pumping stages 26 has therefore a rate of 60 gallons per minute and a pressure of 500 psi since the second series of stages is provided to pump a high volume while partially increasing the pressure of the liquid arriving. Therefore, 70 GPM of liquid at 500 psi are mixed outside the pump P and are directed by the conduit 20 towards the housing 14 which comprises the semi-permeable membrane 16. The permeate coming out of the housing 14 by the outlet 48 can have a rate of 7.5 GPM at a pressure which is almost nil. Consequently, 62.5 GPM are directed towards the recirculation conduit 28 and the outlet of the concentrated liquid 50. For example, the discharge by outlet 50 can be of 2.5 GPM at a pressure which is nearly nil whereas the recirculated liquid through the conduit 28 can have a discharge rate of 60 GPM at a pressure of 485 psi. Therefore, the first and second series of pumping stages 22 and 24 increases the pressure of the inlet liquid whereas the third series of pumping stages 24 pump a considerable recirculation liquid volume. The assembly of the three series of pumping stages enables the pumping at high pressure of an important volume of liquid with derivation and recirculation, and this, with a single pump instead of three.

It is to be noted that one can use this installation not only for the concentration of maple water, but also for all other liquids to be concentrated such as sea water, etc. One can also use this pump having three series of stages in a manner that it would not be associated with a reverse osmosis operation. All systems using a liquid under pressure and which necessitates a derivation, and perhaps a recirculation of the latter, could evidently use the pump of the present invention resulting in the dispensing of using a second and a third pump.

The present pump enables unlimited pumping at the level of flow rates and pressures.

Figure 4:
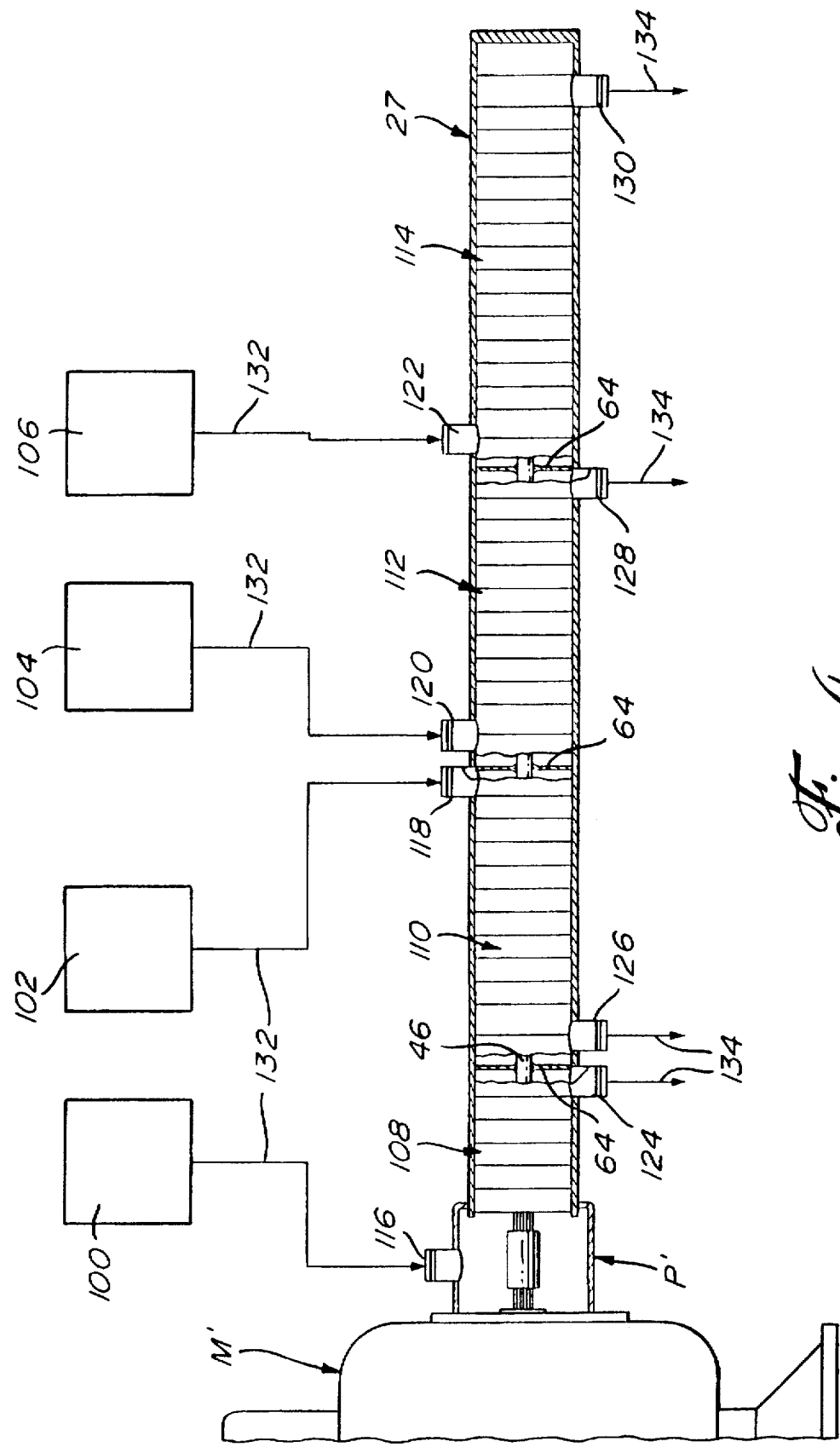
FIG. 4 is a schematic and fragmented representation of a pump having multiple inlets and outlets also in accordance with the present invention.

Referring now to FIG. 4, another pump P' also made in accordance with the present invention is driven by an exterior motor M' by means of a shaft, such as the hexagonal shaft 46 of FIGS. 1 to 3. The pump P' of FIG. 4 is provided to pump four different liquids without having a mixture therebetween. The four liquids are pumped from tanks 100, 102, 104 and 106 by the first, second, third and fourth series of pumping stages 108, 110, 112, and 114, respectively.

The four series of pumping stages comprise liquid inlets 116, 118, 120 and 122, respectively, and liquid outlets 124, 126, 128 and 130, respectively. The conduits for conveying these liquids from reservoirs 100, 102, 104 and 106 to the inlets 116, 118, 120 and 122 of the pump P' are all identified by reference 132 in FIG. 4 whereas the four liquid outlet conduits are identified by reference 134.

The series of pumping stages 108, 110, 112 and 114 are separated from one another in the housing 27 of the pump P' by derivation elements 52 identical to those of FIGS. 1 to 3. In FIG. 4 one can easily see that three separation discs 64 are used to separate the different series of pumping stages.

Therefore, the liquid contained in the reservoir 100 will be pumped by the first series of pumping stages 108 of the pump P' and this, from left to right in FIG. 4 and in the direction of disc 64 separating the first and second series of pumping stages 108 and 110. The liquid coming from the reservoir 102 will flow from right to left in the second series of stages 110 of pump P' and in the direction of the first series of pumping stages 108. The liquids of reservoir 104 and 106 will flow respectively in the third and fourth series of pumping stages 112 and 114 from left to right in FIG. 4. Therefore, in the present pump P', the liquids can circulate independently from left to right or from right to left in the different series of pumping stages 108, 110, 112 and 114. Equally, the flow rates and pressure of the liquids can vary from one series of pumping stages to another.

The pump P' therefore enables the pumping of many liquids having different flow rates and different pressures with the assistance of a single motor which is coupled to a single shaft adapted to drive the different stages of pumping, each one being associated to a respective liquid.

The embodiments of the invention in which an exclusive property or privilege is claimed are defined as follows:

1. Installation for the concentration of a solution by reverse osmosis or other process using a semi-permeable membrane, said installation comprising a housing enclosing a semi-permeable membrane responsible for the concentration of said solution; a multistage centrifugal pump allowing for the introduction of said solution under pressure in said housing; as well as means for ensuring the recirculation of part of said solution, characterized in that said centrifugal pump comprises first and second pumping means adapted to be driven by a single motor, said first pumping means consisting of a first series of pumping stages for untreated liquid; said second pumping means consisting of a second series of pumping stages for recirculated liquid; said first and second pumping stages being hydraulically separated in said centrifugal pump by separation means, said first pumping means including an inlet and outlet for the untreated liquid, said second pumping means including an inlet and an outlet for the recirculated liquid such that a liquid reaching said centrifugal pump through said inlet for untreated liquid is pumped by said first pumping stages and is removed from said pump through said outlet for the untreated liquid, whereas a concentrated liquid from said housing reaches said second pumping stages through said inlet for the recirculated liquid and is removed from said centrifugal pump through said outlet for the recirculated liquid, the liquid and the recirculated liquid being mixed together downstream of said first and second pumping means and upstream of an inlet of said housing.

2. Installation as defined in claim 1, wherein said housing is cylinder-shaped, wherein said separation means comprise a solid disc hermetically and transversally mounted between said housing and a shaft depending from a driving motor while allowing for the rotation of said shaft which drives said first and second pumping means, in such a way that said disc prevents the liquid pumped by said first pumping means from directly reaching said second pumping means, thereby forcing the liquid outside of said housing and thus of said pump through said outlet for the untreated liquid.

3. Installation as defined in claim 1, wherein liquid derivation means are provided for said first pumping means such that the untreated liquid having reached said inlet of said first pumping means is removed from said first pumping means through an intermediary outlet and is returned thereto through an intermediary inlet, whereby the untreated liquid can be treated outside of said housing and between said intermediary outlet and inlet.

4. Installation as defined in claim 3, said liquid derivation means consist of filtering and piping means connected to said intermediary outlet and inlet outside of said housing, whereby the untreated liquid may be filtered outside of side housing and between said intermediary outlet and inlet.

* * * * *